United States Patent
Lerzer et al.

(10) Patent No.: US 12,128,915 B2
(45) Date of Patent: Oct. 29, 2024

(54) DEVICE FOR PROVIDING IMAGE DATA

(71) Applicant: AUDI AG, Ingolstadt (DE)

(72) Inventors: Jürgen Lerzer, Neumarkt (DE);
Christian Braasch, Ingolstadt (DE);
Christoph Dalke, Kipfenberg (DE);
Hans Georg Gruber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 313 days.

(21) Appl. No.: 17/435,199

(22) PCT Filed: Dec. 13, 2019

(86) PCT No.: PCT/EP2019/085040
§ 371 (c)(1),
(2) Date: Aug. 31, 2021

(87) PCT Pub. No.: WO2020/177913
PCT Pub. Date: Sep. 10, 2020

(65) Prior Publication Data
US 2022/0144298 A1    May 12, 2022

(30) Foreign Application Priority Data
Mar. 4, 2019   (DE) .................. 10 2019 202 862.4

(51) Int. Cl.
G09G 5/397      (2006.01)
B60W 50/14     (2020.01)
G06V 20/56     (2022.01)

(52) U.S. Cl.
CPC ............. *B60W 50/14* (2013.01); *G06V 20/56* (2022.01); *G09G 5/397* (2013.01);
(Continued)

(58) Field of Classification Search
CPC ............... G09G 5/397; G09G 2330/12; G09G 2340/10; G09G 2340/12; G09G 2380/10;
(Continued)

(56) References Cited

U.S. PATENT DOCUMENTS 5,784,036 A * 7/1998 Higuchi ................. G02B 27/01
                                              345/173
9,691,359 B2 * 6/2017 Danielsson ............... G06T 5/00
(Continued)

FOREIGN PATENT DOCUMENTS

CN       105845103 A      8/2016
DE     102014212018 A1   12/2015
(Continued)

OTHER PUBLICATIONS

International Preliminary Report on Patentability directed to related International Patent Application No. PCT/EP2019/085040, completed Oct. 6, 2020, with attached English-language translation; 18 pages.

(Continued)

*Primary Examiner* — Antonio A Caschera
(74) *Attorney, Agent, or Firm* — Sterne, Kessler, Goldstein & Fox P.L.L.C.

(57) ABSTRACT

A device for providing image data of an image to be output on a display apparatus in a motor vehicle. The device having an integrated circuit, which includes a computing unit as a component in a first circuit section and a superimposition unit as a component in a second circuit section. The computing unit determines first partial image data relating exclusively to a portion of the image that is safety-relevant. The superimposition unit superimposes second partial image data that are not safety-relevant onto the first partial image data in such a way that the image data in the entire portion of the image, or in regions of the portion for which the first (Continued)

partial image data are not transparent, are predefined by the first partial image data.

13 Claims, 3 Drawing Sheets

(52) U.S. Cl.
CPC . *B60W 2050/143* (2013.01); *B60W 2050/146* (2013.01); *B60W 2420/403* (2013.01); *G09G 2330/12* (2013.01); *G09G 2340/10* (2013.01); *G09G 2380/10* (2013.01)

(58) Field of Classification Search
CPC .................. G09G 5/001; B60W 50/14; B60W 2050/143; B60W 2050/146; G06V 20/56; G06F 12/14; G06F 12/00; G06F 13/34; G06F 9/468
See application file for complete search history.

(56) References Cited

U.S. PATENT DOCUMENTS

| | | | |
|---|---|---|---|
| 10,217,442 B2 | 2/2019 | Meilinger et al. | |
| 10,279,683 B2* | 5/2019 | Torii | B60K 35/00 |
| 11,030,970 B2 | 6/2021 | Carazo et al. | |
| 2001/0033286 A1 | 10/2001 | Stokes et al. | |
| 2016/0307346 A1 | 10/2016 | Staudenmaier et al. | |
| 2019/0171538 A1* | 6/2019 | Gulati | G06T 1/20 |

FOREIGN PATENT DOCUMENTS

| | | |
|---|---|---|
| DE | 102015200292 A1 | 7/2016 |
| DE | 102015002973 A1 | 9/2016 |
| DE | 102015209448 A1 | 11/2016 |
| DE | 102016223341 A1 | 5/2018 |
| DE | 102017200915 A1 | 7/2018 |
| EP | 2279091 B1 | 12/2017 |
| WO | WO 2018/041777 A1 | 3/2018 |

OTHER PUBLICATIONS

International Search Report and Written Opinion of the International Searching Authority directed to related International Patent Application No. PCT/EP2019/085040 mailed Mar. 20, 2020, with attached English-language translation; 21 pages.

Unknown, "Memory Protection Unit (MPU)," Version 1.0, Jul. 8, 2016, available at: https://static.docs.arm.com/100699/0100/armv8m_architecture_memory_protection_unit_100699_0100_00_en.pdf; 39 pages.

* cited by examiner

DEVICE FOR PROVIDING IMAGE DATA

TECHNICAL FIELD

The present disclosure relates to a device for providing image data of an image to be output on a display apparatus, in particular in a motor vehicle. The present disclosure additionally relates to a motor vehicle and to a method for providing image data.

BACKGROUND

Graphic display apparatuses are now used for many purposes in motor vehicles. In this case, different information that can be displayed has different degrees of influence on driving operations. It is known in this case, for example from the publication DE 10 2015 200 292 A1, to display safety-critical content and non-safety-critical content on the same equipment. For example, information from a multimedia system or an air conditioning system can be displayed together with warning symbols or vehicle parameters that are substantial for driving, for example a speed. In order to ensure that safety-critical content is not covered up, it is proposed in the cited publication that the various content be routed to the display equipment as separate data streams and superimposed there with the help of various hardware display layers so that the safety-critical content is always displayed in the foreground.

The disadvantage of the procedure already known in the art is that it requires the use of a relatively complex display equipment and, moreover, the wiring effort in the motor vehicle potentially increases, since separate data streams have to be routed to the display equipment. In such applications, it is also typically desired to comply with a specific safety requirement level, for example a so-called "automotive safety integrity level" (ASIL). Data processing in the display equipment is therefore relatively complex since complex error detection and/or correction and/or a redundant design of computing units may be required to achieve a corresponding safety requirement level or reliability requirement. If, for example, an ASIL class of C or D is to be achieved overall, a lockstep operation of processors may be required in which all calculations are carried out redundantly in order to detect errors. Such an operating mode is often not supported by simpler processor architectures and overall increases the technical effort and energy consumption of the calculation.

In order to also be able to use a simpler display equipment, the mentioned publication suggests first calculating the display elements that are not safety-critical and using corresponding result data as additional input of an ASIL part in order to add safety-critical display elements. In this case too, however, the entire image data must be processed with a high safety requirement level, which results in a very high implementation effort, in particular when using display apparatuses with high resolution and/or at high frame rates, for example when displaying animations.

BRIEF DESCRIPTION OF THE DRAWINGS/FIGURES

DETAILED DESCRIPTION

Figure 1:
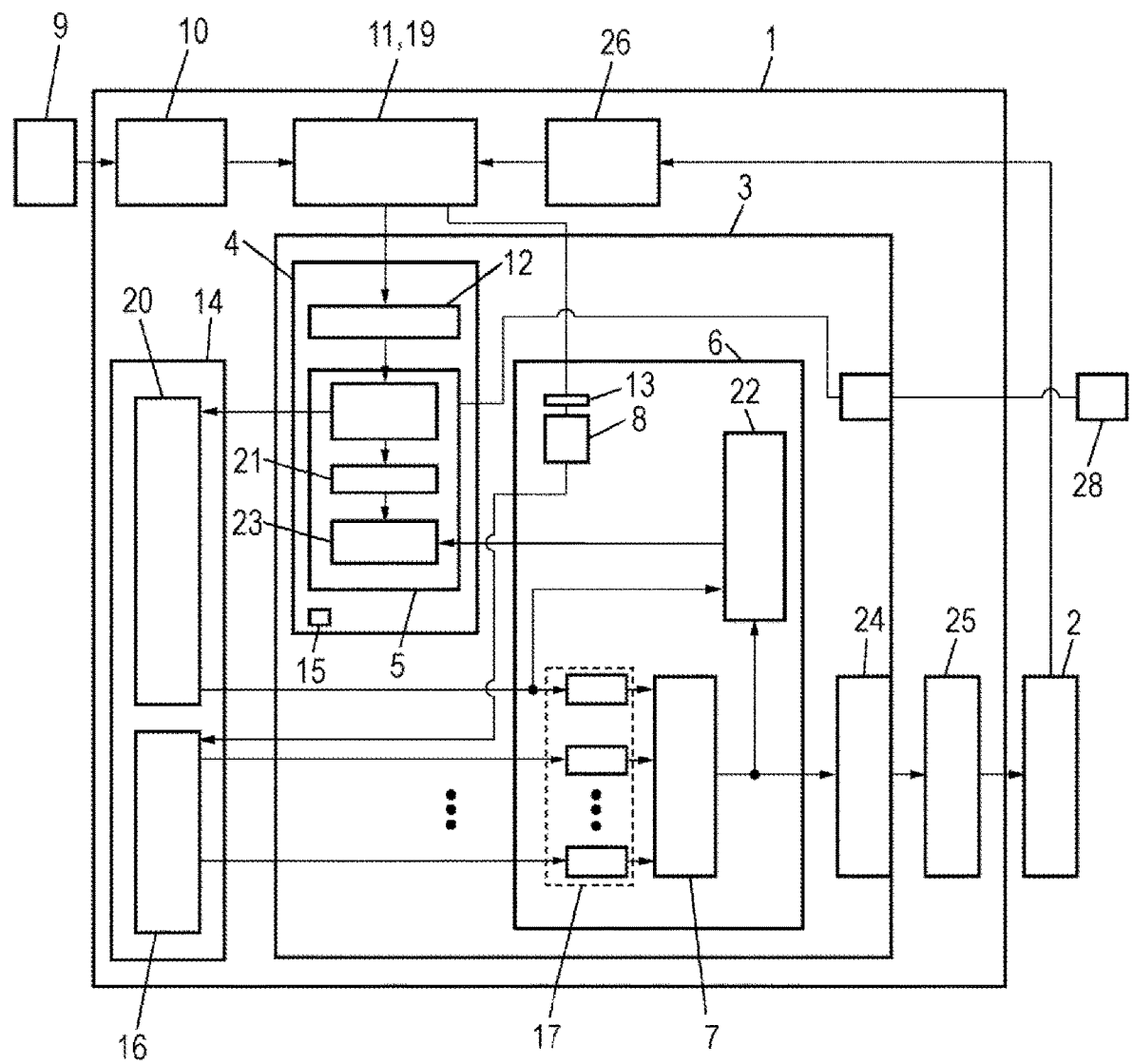
FIG. 1 is an embodiment of a device according to the present disclosure.

The object of the present disclosure is to allow a robust display of, in particular, safety-relevant information on a display apparatus.

The object is achieved according to the present disclosure by a device for providing image data of an image to be output on a display apparatus, in particular in a motor vehicle, the device having an integrated circuit, which includes a computing unit as a component in a first circuit section and a superimposition unit as a component in a second circuit section, wherein the computing unit is designed to determine first partial image data which relate exclusively to a portion of the image not comprising the entire image and which are in particular safety-relevant, and the superimposition unit is designed to superimpose second partial image data which in particular are not safety-relevant on the first partial image data, in such a way that the image data in the entire portion of the image, or in those regions of the portion for which the first partial image data do not include transparency, are predefined by the first partial image data.

It is therefore proposed that the generation of the first partial image data, which is, in particular, safety-relevant, and the superimposition of this first partial image data with second partial image data are carried out jointly in an integrated circuit. It is therefore not necessary for the display apparatus itself to combine image data from different sources, with which, for example, conventional LCD displays and other display apparatuses can be used with the device according to the present disclosure without any problems. At the same time, however, the determination of the first partial image data, which is in particular safety-relevant, and the superimposition of the various image data are carried out by different circuit sections of the integrated circuit and thus not, for example, by a shared processor. As will be explained in more detail later, reliability requirements that differ from one another can apply to these circuit sections, for example they can be developed according to different ASIL classifications. In particular, the second circuit section can have lower reliability requirements, as a result of which, for example, less effort is required there for error detection and/or correction or for redundant computing. Since the computing unit exclusively has to determine first partial image data of a portion of the image not comprising the entire image and optionally the, in particular, safety-relevant first partial image data can also be updated at a lower frame rate, the overall result is that relatively little computing power is required in the first circuit section. Measures to increase the reliability achieved there, i.e. in particular for error detection, error correction, and redundant computing, can therefore be implemented with relatively little effort.

The predefinition by the first partial image data of the image data in the entire portion of the image, or in those regions of the portion for which the first partial image data are not transparent can be achieved, for example, by building up the image in different layers, the data from the uppermost image layer originating exclusively from the first partial image data or the uppermost image layer being exclusively able to be accessed by the computing unit.

The computing unit can be, for example, a microprocessor or comprise a microprocessor. It can be configured to carry out simple rendering tasks and provide simple animations as the first partial image data. The first circuit section or the computing unit can additionally or alternatively comprise a dedicated graphics processor (graphics computing unit, GPU) or graphics processor resources. This allows rendering tasks to be implemented in a compact and energy-efficient manner.

The display apparatus can be designed separately from the device or at least separately from the integrated circuit. The device according to the present disclosure can in particular be used with conventional display apparatuses that can be controlled in accordance with known standard protocols.

The device, in particular the integrated circuit, can have an interface for outputting the image data, which in particular can be part of the second circuit section. The integrated circuit, in particular the first circuit section, can have an integrated RAM memory and/or an interface for coupling to a flash memory. Since higher reliability requirements can exist in the first circuit section, it can be advantageous if the memory used there supports an error correcting method, for example an error correcting code (ECC).

The computing unit or another component of the first circuit section can be designed to change the configuration of components of the second circuit section, in particular of the superimposition unit. For example, it is possible that a preliminary configuration is initially predefined by a component of the second circuit section, which configuration can be changed or overwritten as required by the component of the first circuit section.

The integrated circuit, in particular the second circuit section, can further be configured as a computing unit or a component which provides the second partial image data. The further computing unit can be more powerful than the first computing unit, since lower reliability requirements preferably apply to the further computing unit. Although the computing unit and the further computing unit are arranged on the same integrated circuit, they can be programmed independently of one another and, for example, also run different operating systems. The integration of the further computing unit in the integrated circuit further reduces the technical effort required to implement the explained display.

The first circuit section and the second circuit section can meet different reliability requirements. As an alternative or in addition, the first circuit section and the further computing unit can meet different reliability requirements. In particular, the first circuit section can be implemented as a "safety island," i.e. as a circuit section with increased safety and reliability requirements. The reliability requirements can also be viewed as safety requirement levels in the sense of functional safety. For example, the first and the second circuit section can satisfy different ASIL levels. In particular, the components of the first circuit section can differ from the components of the second circuit section or from the further computing unit with regard to their expected error rates or failure probabilities. For example, an error rate of less than $10^{-6}$/h should be achieved for ASIL class A and an error rate of less than $10^{-8}$/h for ASIL class D. Significantly higher error rates can also be accepted for partial image data that is not safety-relevant. Other substantial parameters with regard to a reliability requirement can be error metrics, for example the single-point fault metric and the latent fault metric.

The first and the second circuit section or the first circuit section and the further computing unit can additionally or alternatively also differ with regard to the measures taken for error detection or error correction. If, for example, ASIL class C or D is to be achieved, all calculations in the first circuit section can be carried out redundantly, for example by a lockstep operation of the computing unit, and/or an error correction of memory accesses can take place, for example using the ECC method.

The first circuit section and the second circuit section or the first circuit section and the further computing unit can also be certified according to different safety requirement levels, in particular according to different ASIL classes, and/or only the first circuit section can be certified. Thus, for example, further developments of the second circuit section or the further computing unit are possible with considerably little effort, since no certification or a less complex certification is required there.

The integrated circuit can in particular be a so-called system on a chip (SoC) or be implemented as an application-specific circuit (ASIC).

The integrated circuit can comprise a test circuit configured to generate a first test value from the first partial image data and a second test value from the image data and to evaluate a test condition, the fulfillment of which depends on the first and second test value. The test condition can only be fulfilled, for example, if both test values are the same. If the test condition is not fulfilled, corresponding measures can be initiated, for example the display apparatus can be deactivated, a safe mode can be selected in which non-safety-relevant image data is no longer displayed, a warning message can be displayed on the display apparatus, or another system for outputting a warning message can be activated. If, as explained above, lower reliability requirements are placed on the second circuit section, its functionality can be monitored through additional use of the test circuit and thus overall a high degree of robustness can nevertheless be achieved.

Since the first test value is determined from the first partial image data and the second test value is determined from the image data, an update of the first partial image data or the image data also results in an update of the respective test value. This also makes it possible, for example, to test a correct display of animations of the first partial image data. When displaying animations, it can also be sufficient if the determination of the first and/or the second test value and/or the evaluation of the test condition is carried out exclusively for the last image or partial image of the animation. This further reduces the processing effort and can be sufficient, since often only one last, still image of an animation is safety-relevant and the preceding animation can primarily serve to improve the ergonomics or to achieve an appealing appearance of the display.

The first or second test value can each depend on color values and transparencies of individual image regions, i.e. for example individual image points.

The test circuit can comprise a first partial test circuit which implements the determination of the first test value and/or the evaluation of the test condition and which is a component of the first circuit section or is implemented by this component, and/or a second partial test circuit, which implements the determination of the second test value and which is a component of the second circuit section or is implemented by this component. This is advantageous, in particular, if the first circuit section meets higher reliability requirements than the second circuit section. For the determination of the second test value, potentially larger amounts of data have to be processed, since this is generated from the image data. In addition, the second test value is potentially updated more frequently because, for example, higher frame rates can be used for the partial image data that are not safety-relevant. It can therefore be advantageous to perform this calculation in the second circuit section since this is possible there with little technical effort due to the low reliability requirement. However, since the determination of the first test value or the evaluation of the test condition are implemented in the first circuit section at the same time, this substantially results in the same reliability for the detection of errors as when the entire test circuit is implemented in the first circuit section. A component of the first circuit section that implements the first partial test circuit may, for example, be the computing unit. Additionally or alternatively, the further computing unit can, for example, implement the second partial test circuit.

The first partial image data can comprise transparency information that indicates for a plurality of sections of the portion whether or to what extent the image in the respective section depends on the second partial image data. The test circuit may be configured to exclusively consider those of the sections in which the image does not depend on the second partial image data, during the determination of the second test value. In particular, a transparency value can be assigned to each image point of the first partial image data. In other words, only that part of the image is taken into account in the examination in which non-transparent parts of the first partial image data are displayed. When the same algorithm is used to calculate the first and second test values, this results in identical test values if the device is functioning correctly. This provides a particularly simple test to correct functioning of the device, in particular of the superimposition unit. At the same time, partial transparencies or complete transparencies of the first partial image data can nevertheless be used, with which a more appealing appearance and also improved ergonomics can be achieved compared to, for example, an opaque rectangular superimposition of the first partial image data.

The device can comprise a memory unit which is connected to the superimposition unit in such a way that the superimposition unit receives the first partial image data from a first memory section of the memory unit and reads out the second partial image data from a second memory section of the memory device. The integrated circuit, in particular the first circuit section, includes a memory access controller configured to write to the first memory section exclusively by a component or to a plurality of components of the first circuit section, by the computing unit. The memory access controller can in particular be configured as a memory protection unit. The present disclosure allows for the integrated circuit to have only one memory interface, whereby a memory unit mentioned above, for example a DRAM, can be used both as a buffer for the first partial image data and for the second partial image data. The memory protection ensures that a malfunction in the second circuit section cannot result in a change in the first partial image data, as a result of which these high reliability requirements can be met.

The robustness of the data processing in the first circuit section can potentially be further increased if the first circuit section additionally has its own memory unit to store programs and/or memory allocation tables executed by the first computing unit for the memory access controller, such as an internal SRAM memory and/or a dedicated DRAM memory. A secure initialization of the components of the first circuit section can be achieved by, for example, a program executed by the computing unit, memory allocation tables, or the like read out from a permanent memory when the device is started. The permanent memory is included in the first circuit section and can include a ROM, an EPROM, or flash memory.

The memory unit can include error correction at least for the first memory section. For example, an error correcting code (ECC) can be used.

In particular, a direct memory access of the computing unit to the first memory section and/or the further computing unit to the second memory section can be made possible, whereby the computing unit or the further computing unit can provide the first or second partial image data directly via a respective image buffer, namely the first or second memory section, to the superimposition unit.

The device can comprise at least one communication interface for connection to at least one communication unit, the communication interface either being connected to the integrated circuit in such a way that exclusive components of the first circuit section can access the communication interface on the circuit side, or the communication interface being coupled via a switch of the device or a routing function implemented by the device to the first circuit section and the second circuit section. The use of a switch or a routing function allows communication units to be selectively connected to components of the first circuit section or components of the second circuit section. In particular, a switch or a routing function can selectively connect different subnetworks or selectively form specific point-to-point connections. Corresponding switches and routing functions are well known to a person of ordinary skill in the art, in particular, of network applications and will not be explained in detail. The exclusive assignment of the communication interface to the first circuit section or the connection via a switch or a routing function allows the second circuit section to not influence or disrupt communication between components of the first circuit section and an external communication unit. A high level of reliability can thus also be achieved for this communication, even if the circuit sections meet different reliability requirements. In particular, safety-relevant data are forwarded to the first circuit section and other data are forwarded to the second circuit section by the switch or the routing function. The switch or the routing function can be implemented as a hardware component, in software or partly in software and partly in hardware.

The communication interface can serve to couple the integrated circuit with a vehicle-side bus or network, for example a CAN bus, a CAN FD bus, or an Ethernet. As an alternative or in addition, a serial, in particular a UART, interface can be used, to communicate in a targeted manner with individual components such as the display apparatus. The connection to a vehicle-side bus or network can serve to receive messages that include information that is to be output as safety-relevant information or that is intended to trigger the output of safety-relevant information, for example a warning icon. Serial communication with a display apparatus can be used, for example, to read back images or image data displayed or received, or values and/or status information of the display apparatus determined therefrom. This is explained in more detail below.

The switch or the routing function can be implemented by the integrated circuit or by at least one component of the device formed separately from the integrated circuit. If a plurality of switches or routing functions are used, for example for different communication interfaces of the device, the switches or routing functions can also be implemented partly by the integrated circuit and partly outside the integrated circuit.

The device can comprise a display apparatus which is connected to an interface of the integrated circuit for outputting the image data or signals dependent on the image data. The display apparatus may additionally be connected via a communication interface of the device or one of the communication interfaces of at least one component of the first circuit section to provide operating information of the display apparatus. The communication interface can be the or one of the communication interfaces explained above. Alternatively, a further communication interface of the device can be used for communication between the display apparatus and the component of the first circuit section. By providing the operating information, malfunctions of the display apparatus itself or the connection between the display apparatus and the integrated circuit can be detected and a corresponding reaction such as switching off the display apparatus, outputting a warning or the like, can be initiated.

Even in the case of display apparatuses of relatively simple design, it is typically recognized when an image data stream is interrupted. For example, it can be recognized that no synchronization signal was received over a specific period of time, that a specific signal level or data value remained constant, or the like. If this is recognized on the display apparatus side, this information can be communicated back to the integrated circuit via the communication interface in order to initiate a corresponding reaction.

As an alternative or in addition, it is also possible that the display apparatus itself comprises systems for error detection or error diagnosis in the context of functional safety. In the event of a malfunction or an error in the display apparatus, the display apparatus can recognize and report the malfunction and/or error to the integrated circuit.

It is also possible for the display apparatus itself to report back to the integrated circuit. The display apparatus can be configured to report image data displayed by the display apparatus or stored in an image memory of the display apparatus or values derived therefrom, for example test values or the like. For example, a test value for the image data provided to the display apparatus can be generated in the integrated circuit and a test value for the image data output can be generated on the display apparatus side. The test values can then be compared in order to detect errors in the context of the display.

The connection between the display apparatus and the integrated circuit via the communication interface and via the interface for outputting the image data can take place via separate lines. However, it is also possible that, for example, a physical connection of the integrated circuit or a circuit comprising the circuit for connecting a connecting cable of the display apparatus has an additional contact or a plurality of additional contacts via which the communication interface can communicate. In principle, it would also be possible for the image data and the data transmitted via the communication interface to be multiplexed or the like, for example, by means of external wiring of the integrated circuit.

The computing unit or a further component of the first circuit section can be designed to generate audio data and output it to a further component of the device or an external component. For example, this can take place as a message that is received via the communication interface or at least one of the communication interfaces, in particular from a vehicle-side communication network. The receiving component can serve to output the audio data directly. However, the receiving component is preferably an audio system of the motor vehicle which, in addition to the audio data generated by the device, can also output other audio data. The audio data can be fed in via a dedicated audio channel. In this way or in some other way it can be ensured that the audio data generated by the computing unit or the further component of the first circuit section results in an audible audio signal. For example, if other audio data are to be output at the same time, the output of the other audio data can be suppressed or their volume can be reduced. This can be used, for example, to output warning tones or other warning signals in a robust and audible manner.

In addition to the device according to the present disclosure, the present disclosure relates to a motor vehicle which comprises a device according to the present disclosure. The device according to the present disclosure can output safety-relevant warning messages, notifications, and/or parameters together with other data like navigation or multimedia data, on a display. The present disclosure can be used to allow for corresponding information to be displayed with little technical effort, while nevertheless meeting specific reliability requirements or, in particular, safety requirement levels. For example, by designing the first circuit section in such a way that it satisfies an ASIL class of A, B, C, or D, this ASIL class can typically already be achieved for the output of the first partial image data. As explained above, the first circuit section can also be used to provide audio signals, so that these can also be output with a corresponding reliability or safety requirement level.

The motor vehicle according to the present disclosure can comprise a vehicle-side communication network connected to the computing unit via a processing apparatus and a communication interface of the integrated circuit or via the communication interface directly. The processing apparatus and/or the computing unit being configured to select a notification type when a message is received via the communication network. The computing unit being configured to display the first partial image data as a function to determine the notification type. This allows for robust data output if, for example, a fixed icon or a fixed predefined animation is to be output when a corresponding message is received. For example, error messages, predefined warning notifications or the like can be output with little effort.

The use of an external processing apparatus can serve to further reduce the size of the first circuit section, i.e. in particular a safety island of the integrated circuit. In particular, the processing apparatus can receive all messages from the communication network and only transmit the notification type to the computing unit when a specific notification is to be output, whereby the data processing required can be further restricted. If the notification type is to be determined by the computing unit, a switch integrated into the integrated circuit or device can be used to ensure that only messages relevant to the computing unit or to the notification output are actually transmitted to the computing unit, in order to allow a computational effort to be further reduced there.

In particular, it is possible for first partial image data to be generated only when a corresponding message has been received from the vehicle-side communication network. As long as no message has been received, the second partial image data can exclusively be generated and output.

The generated first partial image data can be maintained for a fixed time interval after receipt of a corresponding message or until a further message is received.

The transmission unit can superimpose a plurality of second partial image data. For example, different vehicle systems or also a single vehicle system can output layers to be superimposed, which are superimposed by the superimposition unit. In this case, however, the superimposition always takes place in such a way that first partial image data, insofar as these are available and not completely transparent, are displayed in the foreground of the image and thus cover the second partial image data of all display layers.

In addition, the present disclosure relates to a method for providing image data of an image to be output to a display apparatus, in particular in a motor vehicle, wherein an integrated circuit is used, which includes a computing unit as a component in a first circuit section and a superimposition unit as a component in a second circuit section. The first partial image data are determined by the computing unit as safety-relevant and relate exclusively to a portion of the image not comprising the entire image. The second partial image data which are not safety-relevant are superimposed on the first partial image data by the superimposition unit in such a way that the image data in the entire portion of the image, or in those regions of the portion for which the first partial image data are not transparent, are predefined by the first partial image data. The method can be developed with features that have been explained for the device according to the present disclosure or the motor vehicle according to the present disclosure, with the advantages mentioned.

The method according to the present disclosure can be part of a warning method in which the determination of the first partial image data or the superimposition of the first and second partial image data only takes place when a warning condition is fulfilled. If the warning condition is not fulfilled, the second partial image data can exclusively be output. The warning condition can depend in particular on whether a message relating to a warning is received via a vehicle network.

Further advantages and details of the present disclosure will become apparent from the following embodiments and the accompanying drawings.

FIG. 1 shows a device 1 for providing image data to a display apparatus 2, which can be used in particular in motor vehicles, for example to allow for a sufficiently robust output of warning notifications and the like. The device 1 has an integrated circuit 3, which includes a computing unit 5 as a component in a first circuit section 4 and a superimposition unit 7 and preferably a further computing unit 8 as a component in a second circuit section 6. The first circuit section 4 and the second circuit section 6 preferably meet different reliability requirements. For example, the first circuit section 4 can have an ASIL class of A, B, C, or D and the second circuit section 6 might not be ASIL classified or have an ASIL class of QM. In particular, the safety requirement class of the first circuit section 4 can be higher than that of the second circuit section 6. This can be achieved, for example, by adhering to specific predefinitions for the first circuit section 4 in the course of development, by providing circuits for error detection or correction, and/or by carrying out at least parts of the computing steps redundantly in order to detect or correct errors.

The computing unit 5 is configured to determine first partial image data which are in particular safety-relevant. The further computing unit 8 is used to provide second partial image data which in particular are not safety-relevant. Since higher reliability requirements apply to the first circuit section 4, a higher circuit complexity is typically required to carry out calculations in this circuit section. In order to keep the computational effort in the first circuit section 4 low, the first partial image data are calculated exclusively for a portion of the image not comprising the entire image. The first partial image data can, for example, be superimposed at a fixed position of the image or the position of the superimposition can be predefined by the computing unit 5.

The determined first and second partial image data are superimposed by the superimposition unit 7 in such a way that the image data in the entire portion of the image for which the first partial image data are determined, or in those regions of the portion for which the first partial image data do not include any transparency, are predefined exclusively by the first partial image data. For example, the superimposition unit is configured in such a way that image elements lying in different image planes the foremost image plane, and/or the elements of which are able to cover elements in the image plane lying behind it are superimposed. The superimposition unit also is configured to exclusively receive first partial image data or be writable by the computing unit 5.

Figure 2:
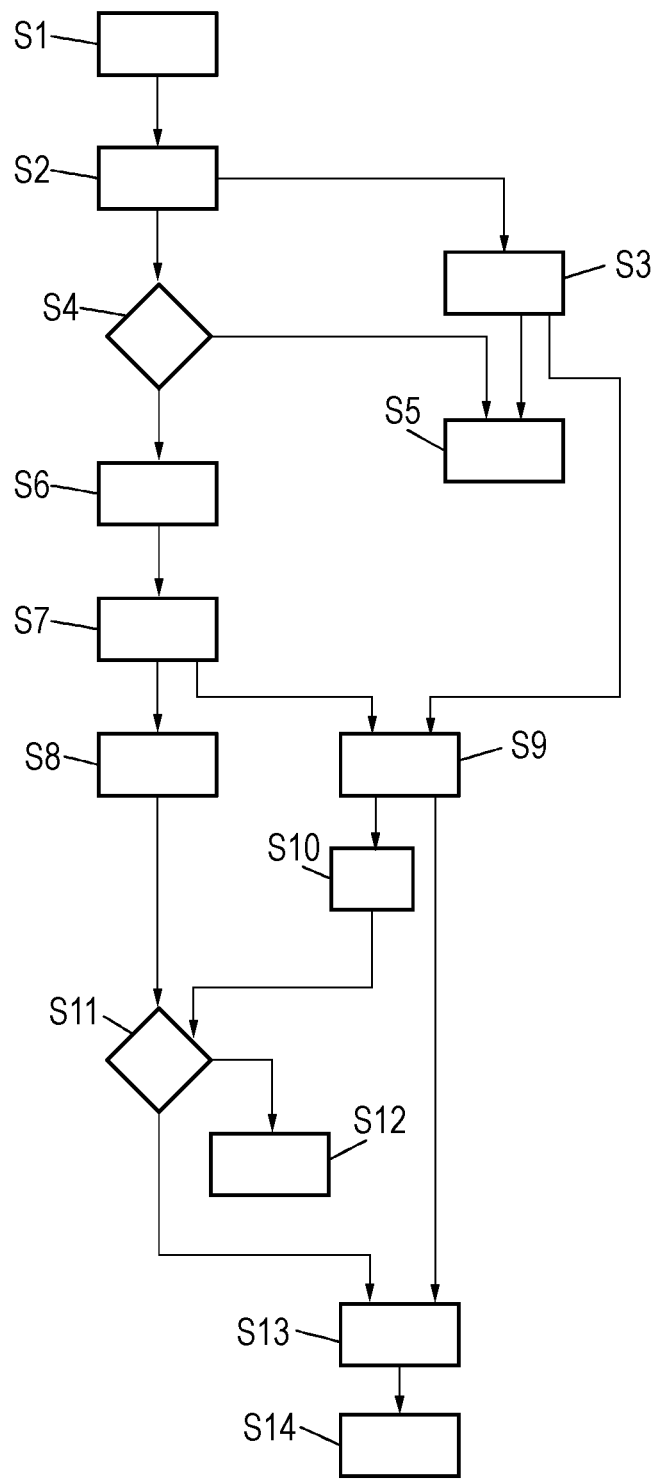
FIG. 2 is a flowchart of an embodiment of the method according to the present disclosure.

The procedure for providing the image data is explained in more detail below with reference to the flowchart shown in FIG. 2. In this case, information is initially provided by various vehicle systems in step S1. Parts of this information may have little or no relevance for driving operations. For example, it can be multimedia data, weather information, information from a navigation system, and the like. Although this information is to be displayed on the display apparatus 2, errors in the display are, however, not very critical and, if necessary, it should also be possible to cover corresponding information by more relevant data. Other data such as a current speed or warning notifications about malfunctions in specific vehicle systems, have a high level of safety relevance and should therefore be displayed with a high degree of robustness and should not be covered. Corresponding data are provided to the device 1 by various devices via a communication unit 9 like a CAN bus or an Ethernet in a vehicle network. They are provided via a network interface 10 of the device 1 to a switch 11, which can be implemented, for example, by a microcontroller which, in step S2, can selectively provide packets to the computing unit 5 via a secure communication interface 12 of the first circuit section or to the further computing unit 8 via a further communication interface 13 of the second circuit section 6. The switch 11 could in principle establish point-to-point connections between the communication interfaces 12, 13 and the communication unit 9 or components connected thereto. Preferably, however, data are selectively forwarded to individual interfaces 12, 13, which is easily possible in particular in the context of packet-switching protocols and is well known in the prior art.

In an embodiment (not shown), the switch 11 could also be implemented by the integrated circuit 3. The switch 11 can be implemented both in hardware and as a software component. Instead of a switch 11, a routing function can also be implemented.

In step S3, second partial image data are generated by the further computing unit 8 and stored in a memory unit 14, like a DRAM memory, which serves as an image buffer. In this case, the second partial image data can also be provided in the form of a plurality of image layers, which are first superimposed by the superimposition unit 7.

In order to be able to use a common memory unit 14 as an image buffer for both the first and the second partial image data, a memory access controller 15 is used to ensures that write access to a memory section 20 is possible by components of the first circuit section 4, such as the computing unit 5. The second partial image data are accordingly stored in a second memory section 16.

In step S4, the computing unit 5 tests whether first partial image data are to be output, for example whether a warning or notification condition is fulfilled, i.e. whether corresponding messages from the communication unit 9 have been received. If this is not the case, output of first partial image data can be suppressed in that a maximum transparency is predefined for all image points of the first partial image data, so that the second partial image data is not covered in any image region. Alternatively, the computing unit 5 can configure the superimposition unit 7 or the memory interface 17 thereof, which in particular allows direct memory access to the memory unit 14, in such a way that no first partial image data are used during the superimposition, i.e., in particular, a corresponding layer is not displayed.

In step S5, the image is thus generated exclusively as a function of the second partial image data and transmitted to the display apparatus 2 via an interface 24 of the integrated circuit 3 and a physical connection 25 for the display apparatus 2 and displayed there.

If, on the other hand, it was determined in step S4 that a display of first partial image data is desired, then these are generated in steps S6 and S7. In step S6, a notification type is first selected, which can be specified in the message received via the communication interface 12, for example. For example, the notification type can indicate that a specific warning icon or a specific warning animation is to be output or the like. The computing unit 5 itself can select a notification type, but in principle it would be possible to use a processing apparatus 19 in addition to the external switch 11 or as an alternative thereto, which processing apparatus determines a notification type outside of the integrated circuit 3 and provides a message relating to the notification type via the communication interface 12 to the computing unit 5.

In step S7, first partial image data are generated in accordance with the notification type, i.e., for example, read out from an internal memory or generated dynamically. By reading out an image sequence in successive time steps, an animation can be used, for example. In a further development of the device 1 shown, it would also be possible, in addition or as an alternative to the output of notifications in accordance with fixed notification types, to provide first partial image data directly as a function of parameters that are provided via the communication interface 12, for example to determine first partial image data directly from a numerical value describing a speed or the like.

In order to determine whether the first partial image data are correctly reproduced after the superimposition, a first test value is generated from the first partial image data, for example a CRC value, in step S8. This is done by implementing corresponding programming of computing unit 5 by a first partial test circuit 21 in the first circuit section 4.

In step S9, the first and second partial image data are superimposed by the superimposition unit 7. In this case, a layer-like superimposition can take place with image data of a bottom image layer initially being written into an internal buffer memory and being partially overwritten by an image layer above, taking into account the transparency in an image layer above, etc. In this case, the image data of the various image layers are read out directly from the memory unit 14 by the memory access controller 17. The memory access controller 17 being configured by the computing unit 5 in such a way that image data of the uppermost image plane can be read exclusively from the first memory section 20, to which they can exclusively be written by the computing unit 5. This ensures that the image data of the uppermost image plane are predefined by the computing unit 5 and thus by a component of the first circuit section 4.

In step S10, a second partial test circuit 22, which is part of the second circuit section 6, generates a second test value from the superimposed image data. Sections of the image data that do not depend on the second partial image data are taken into account in this case, i.e. exclusively as a function of the image data of the portion in which the first partial image data does not include any transparency. This allows for a simple comparison between the second test value with the first test value. This comparison takes place in step S11 and is carried out by the partial test circuit 23, which is implemented in particular by corresponding programming of the computing unit 5.

If it is determined in step S11 that the first and second test values are not the same, a corresponding safety measure is initiated in step S12, for example the display apparatus 2 is deactivated, a corresponding warning is output via a further vehicle component or the like.

If the first and second test values are identical, it is ensured that the first partial image data are displayed correctly at least in those sections in which they are not transparent. The superimposed image can therefore be output in step S13, as was already explained in step S5 for the image exclusively comprising the second partial image data.

In step S14, the extent the image was correctly output by the display apparatus 2 may be tested. In the simplest case, the display apparatus 2 can exclusively test whether a correct data stream is being received by the device 1, in particular whether incoming data change regularly. If this is not the case, the display apparatus 2 can send a corresponding message to the device 1 in order to initiate corresponding measures, as was explained with regard to step S12. The message can be provided to the computing unit 5, for example, via a peripheral network interface 26 of the device 1 and the switch 11. Additionally or alternatively, test functions that test the correct functioning of the display apparatus can be implemented in the display apparatus 2 itself. If an error is found in the display apparatus 2, corresponding information can also be transmitted to the computing unit 5, as explained above. The provision of operating information from the display apparatus 2 to the computing unit 5 can, as shown in FIG. 1, take place via the communication interface 12, which is also used for communication with the communication unit 9. Alternatively, in an embodiment (not shown), it would be possible to use a separate communication interface for communication with the display apparatus.

Another possibility of increasing the robustness of the system is to use the partial test device 22 to additionally determine a further test value that relates to the entire image and to generate a corresponding test value also on the display apparatus side and to compare these test values, for example by means of the computing unit 5.

For specific notifications, it can be useful to carry out an acoustic output in addition or as an alternative to displaying a corresponding notification on the display apparatus 2. The computing unit 5 or a further component of the second circuit section 4 can therefore also be configured to generate audio data and output it to a further component of the device 1 or an external component 28. In this case, the component 28 can be designed in such a way that the output audio data always result in an audible audio output, for example in that other audio outputs are interrupted or their volume is reduced during the output of the audio data.

Figure 3:
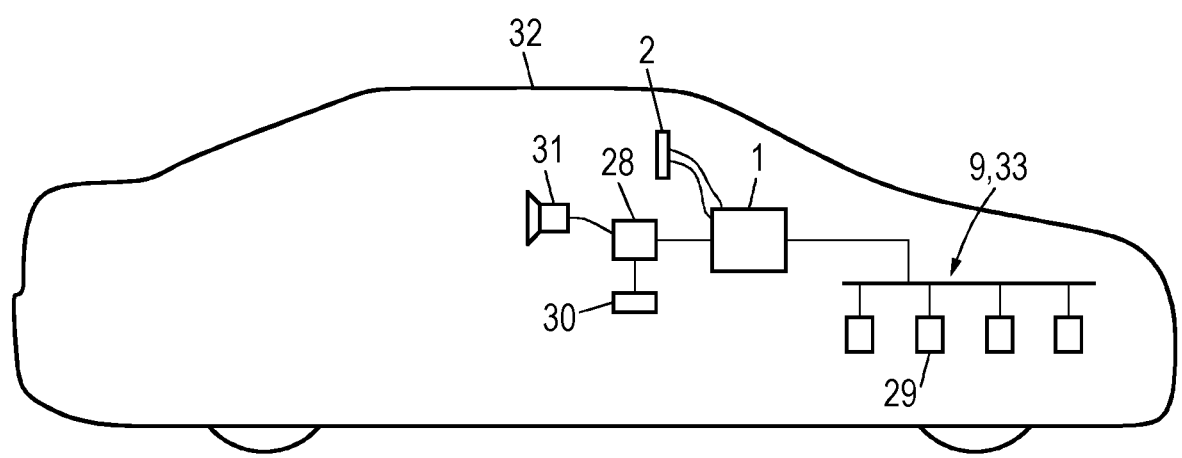
FIG. 3 is an embodiment of a motor vehicle according to the present disclosure.

FIG. 3 shows a motor vehicle 32 that includes the device 1. The device 1 is connected via the communication unit 9, i.e. a vehicle-side communication network 33, to a plurality of components 29 on the motor vehicle. For example, the communication network 33 can provide navigation data and/or multimedia data as data which are not safety-relevant to the device 1. The communication network 33 can also provide information on warning notifications and/or parameters to be output as safety-relevant data. The output of corresponding image data has already been explained above with reference to FIGS. 1 and 2. The component 28 is in this case is an audio system of the motor vehicle 32, to which audio information from a component 30, for example a multimedia system, is played during normal operation and is output via a loudspeaker 31. If audio signals are received by the device 1, the volume of this additional audio data is reduced or the output of the additional audio data is suppressed, so that an audio signal generated by the device 1 can be output by the loudspeaker 31 in a clearly audible manner.

The invention claimed is:

1. A device for providing image data of an image to be output on a display apparatus, the device comprising:
    an integrated circuit, wherein the integrated circuit has an interface configured to output the image data to the display apparatus, the integrated circuit further including:
        a computing unit, wherein the computing unit is a component in a first circuit section and configured to determine first partial image data, wherein the first partial image data relates exclusively to a portion of the image, and
        a superimposition unit, wherein the superimposition unit is a component in a second circuit section and configured to superimpose second partial image data on the first partial image data such that the image data in the entire portion of the image, or in regions of the portion of the image for which the first partial image data are not transparent, are predefined by the first partial image data; and
    wherein the device further comprises a memory device connected to the superimposition unit to allow the superimposition unit to receive the first partial image data from a first memory section of the memory device and to read the second partial image data from a second memory section of the memory device,
    wherein the first circuit section has a first error rate that meets reliability requirements of at least ASIL (Automotive Safety Integrity Level) class A and the second circuit section has a second error rate that meets lower reliability requirements, and
    wherein the first circuit section further includes a memory access controller configured to exclusively allow at least one component of the first circuit section to write to the first memory section.

2. The device of claim 1, wherein the integrated circuit further includes a second computing unit to provide the second partial image data.

3. The device of claim 2, wherein the first circuit section and the second computing unit meet different reliability requirements.

4. The device of claim 1, wherein the integrated circuit further includes a test circuit configured to generate a first test value from the first partial image data and a second test value from the image data and further configured to evaluate the first test value and the second test value to determine a test condition.

5. The device of claim 4, wherein the test circuit comprises a first partial test circuit or a second partial test circuit,
    wherein the first partial test circuit is a component of the first circuit section to implement the first test value or the test condition, and
    wherein the second partial test circuit is a component of the second circuit section to implement the second test value.

6. The device of claim 4, wherein the first partial image data includes transparency information indicating an extent that a section of the portion of the image relies on the second partial image data, and
    wherein the test circuit is further configured to consider an indicated section of the portion of the image that does not depend on the second partial image data during the generating of the second test value.

7. The device of claim 1, further comprising at least one communication interface connected to at least one communication unit and, either:
    the integrated circuit such that the first circuit section can access the at least one communication interface, or
    the first circuit section and the second circuit section by a switch of the device or a routing function implemented by the device.

8. The device of claim 7, wherein the switch or the routing function is implemented by the integrated circuit or by at least one component of the device separate from the integrated circuit.

9. The device of claim 1, wherein the display apparatus is connected to an interface of the integrated circuit for outputting the image data or signals dependent on the image data and to at least one component of the first circuit section to receive operating information of the display apparatus by at least one communication interface.

10. The device of claim 1, wherein the computing unit or a second component of the first circuit section is configured to generate audio data and output the audio data to another component of the device or an external component.

11. A motor vehicle having a device for providing image data of an image to be output on a display apparatus, the device comprising:
    an integrated circuit, wherein the integrated circuit has an interface configured to output the image data to the display apparatus, the integrated circuit further including:
        a computing unit wherein the computing unit is a component in a first circuit section and configured to determine first partial image data, wherein the first partial image data relates exclusively to a portion of the image,
        a superimposition unit, wherein the superimposition unit is a component in a second circuit section and configured to superimpose second partial image data on the first partial image data such that the image data in the entire portion of the image, or in regions of the portion of the image for which the first partial image data are not transparent, are predefined by the first partial image data; and
    wherein the device further comprises a memory device connected to the superimposition unit to allow the superimposition unit to receive the first partial image data from a first memory section of the memory device and to read the second partial image data from a second memory section of the memory device,
    wherein the first circuit section has a first error rate that meets reliability requirements of at least ASIL (Automotive Safety Integrity Level) class A and the second circuit section has a second error rate that meets lower reliability requirements, and
    wherein the first circuit section further includes a memory access controller configured to exclusively allow at least one component of the first circuit section to write to the first memory section.

12. The motor vehicle of claim 11, further comprising:
    a vehicle-side communication network connected to the computing unit by a processing apparatus and at least one communication interface;

wherein the processing apparatus and the computing unit are configured to select a notification type when a message is received via the communication network, and the computing unit is further configured to display the first partial image data as a function of the notification type.

13. A method for providing image data of an image to be output to a display apparatus, the method comprising:

determining, by a computing unit included in a first circuit section of an integrated circuit, first partial image data that relates to a portion of the image and the second partial image data, wherein the integrated circuit has an interface configured to output the image data to the display apparatus;

superimposing, by a superimposition unit in a second circuit section of the integrated circuit, the second partial image data on the first partial image data such that the image data in the entire portion of the image, or in regions of the portion of the image for which the first partial image data are not transparent, are predefined by the first partial image data; and receiving, from a memory device connected to the superimposition unit, the first partial image data from a first memory section of the memory device and to read the second partial image data from a second memory section of the memory device, wherein the first circuit section has a first error rate that meets reliability requirements of at least ASIL (Automotive Safety Integrity Level) class A and the second circuit section has a second error rate that meets lower reliability requirements, and wherein the first circuit section further includes a memory access controller configured to exclusively allow at least one component of the first circuit section to write to the first memory section.

* * * * *